(12) United States Patent
Al-Absi et al.

(10) Patent No.: US 9,648,684 B1
(45) Date of Patent: May 9, 2017

(54) CAPACITOR-LESS LED DRIVE

(71) Applicant: KING FAHD UNIVERSITY OF PETROLEUM AND MINERALS, Dhahran (SA)

(72) Inventors: Munir A. Al-Absi, Dhahran (SA); Zainulabideen J. Khalifa, Dhahran (SA); Alaa Hussein, Dhahran (SA); Hesham M. Al Bar, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 0 days.

(21) Appl. No.: 14/951,462

(22) Filed: Nov. 24, 2015

(51) Int. Cl.
*H05B 33/08* (2006.01)

(52) U.S. Cl.
CPC ..... *H05B 33/0818* (2013.01); *H05B 33/0821* (2013.01)

(58) Field of Classification Search
CPC H05B 33/08; H05B 33/0815; H05B 33/0818; H05B 33/0821; H05B 33/0824; H05B 33/0883
See application file for complete search history.

(56) References Cited

U.S. PATENT DOCUMENTS

| | | | |
|---|---|---|---|
| 6,577,072 B2 * | 6/2003 | Saito | H05B 33/0809 315/185 R |
| 8,829,802 B2 | 9/2014 | Wei et al. | |
| 2010/0164404 A1 * | 7/2010 | Shao | H05B 33/0815 315/297 |
| 2011/0227496 A1 * | 9/2011 | Lin | H05B 33/0818 315/209 R |
| 2013/0314961 A1 * | 11/2013 | Eom | H02M 1/4208 363/89 |
| 2014/0252965 A1 * | 9/2014 | Pope | H02M 3/04 315/185 R |
| 2014/0285102 A1 | 9/2014 | Jain et al. | |
| 2015/0180325 A1 | 6/2015 | Liang et al. | |
| 2015/0188444 A1 | 7/2015 | Boe | |
| 2015/0271893 A1 * | 9/2015 | Lee | H05B 33/0887 315/186 |
| 2015/0312983 A1 * | 10/2015 | Hu | F21K 9/1355 315/186 |

OTHER PUBLICATIONS

Wang et al., "A Flicker-Free Electrolytic Capacitor-Less AC-DC LED Driver," 2011 IEEE Energy Conversion Congress and Exposition (ECCE), pp. 2318-2325, Sep. 17-22, 2011.

(Continued)

*Primary Examiner* — Thai Pham
(74) *Attorney, Agent, or Firm* — Richard C. Litman

(57) ABSTRACT

The capacitor-less LED drive is an LED drive circuit having a design based on the utilization of the internal capacitance of the LED to replace the smoothing capacitor in a conventional buck converter in a power supply. LED lighting systems usually have many LEDs for better illumination that can reach multiple tens of LEDs. Such a configuration can be utilized to enlarge the total internal capacitance, and hence minimize the output ripple. Also, the switching frequency of the buck converter is selected such that minimum ripple appears at the output. The functionality of the present design is confirmed experimentally, and the efficiency of the drive is 85% at full load.

4 Claims, 9 Drawing Sheets

(56) References Cited

OTHER PUBLICATIONS

Wu Chen and Hui, S.Y.R., "Elimination of an Electrolytic Capacitor in AC/DC Light-Emitting Diode (LED) Driver With High Input Power Factor and Constant Output Current," IEEE Transactions on Power Electronics, vol. 27, Issue 3, pp. 1598-1607, May 2, 2011.

* cited by examiner

CAPACITOR-LESS LED DRIVE

BACKGROUND OF THE INVENTION

1. Field of the Invention

The present invention relates to power supply circuits, and particularly to a capacitor-less LED drive.

2. Description of the Related Art

Light emitting diodes (LEDs) are beginning to experience widespread use in many lighting applications. LED lighting is replacing the florescent lighting because of its advantages, mainly low power consumption and long life expectancy. However, commercial LED drive circuits limit the life expectancy of the LED lighting system by around one-fifth of the lifetime of the LED itself. The main source of shortening the lifetime of the drive is the smoothing capacitor. This is due to the leakage in this capacitor and, hence, degradation in the drive circuit with time. Several works on electrolytic capacitor-less LED drives have been presented to maximize the overall lifetime of the LED system. However, most of the works presented require relatively complicated power circuit or current-controlled technique to reduce the size of the energy storage capacitor.

Thus, a capacitor-less LED drive solving the aforementioned problems is desired.

SUMMARY OF THE INVENTION

The capacitor-less LED drive circuit is based on a buck converter circuit where an LED replaces the smoothing capacitor. The internal capacitance of the LED (or an LED array) will act as smoothing capacitor when a proper switching frequency and duty cycle are chosen.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The capacitor-less LED drive circuit is based on a buck converter circuit where an LED replaces the smoothing capacitor. The internal capacitance of the LED (or an LED array) will act as smoothing capacitor when a proper switching frequency and duty cycle are chosen.

Figure 1:
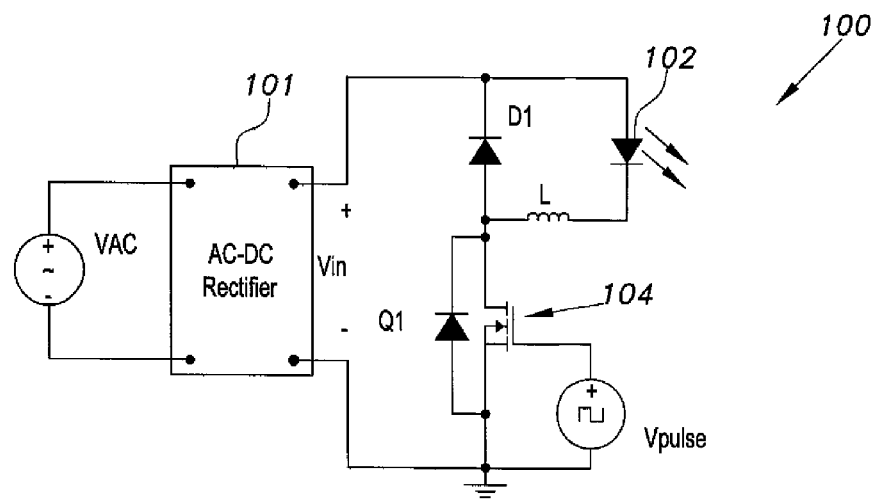
FIG. 1 is a schematic diagram of the capacitor-less LED drive according to the present invention.

As shown in FIG. 1, the capacitor-less LED drive circuit 100 rectifies an AC source VAC using an AC-DC rectifier circuit 101. The negative terminal of the rectifier circuit 101 is connected to the source of a switching transistor Q1 in parallel with a diode, as shown at 104. A gate of the transistor Q1 is connected to a pulse source, Vpulse, which switches the transistor Q1 on and off at a selected duty cycle. The drain of Q1 is connected to the anode of diode D1 and to a first lead of inductor L, The cathode of diode D1 is connected to the positive terminal of the AC-DC rectifier circuit 101. An LED 102 (or an array of LEDs connected in parallel to each other) is connected between the cathode of diode D1 and a second lead of inductor L (the anode of the LED 102 being connected to cathode of diode D1, and hence the positive terminal of the rectifier circuit 102, and the cathode of LED 102 being connected to the second lead of the inductor L).

Figure 2:
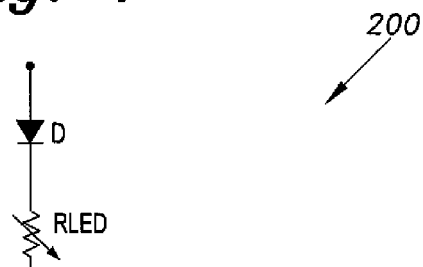
FIG. 2 is a schematic diagram showing a DC mode model of a light emitting diode (LED).
Figure 3:
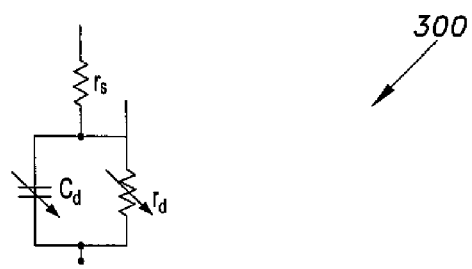
FIG. 3 is a schematic diagram showing an AC mode model of a light emitting diode (LED).
Figure 4:
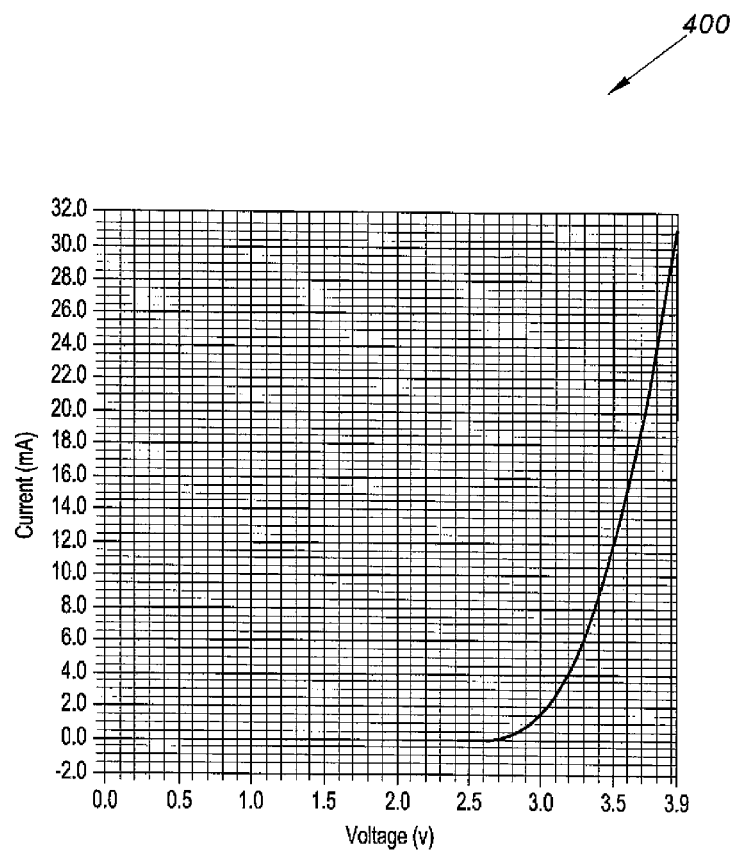
FIG. 4 is a plot showing V-I characteristics curve of a single white LED.

An LED in conduction mode can be modeled using a resistor and an ideal diode for DC mode 200 and a capacitor and a resistor in parallel for AC mode 300 as shown in FIGS. 2 and 3, i.e., an LED inherently exhibits capacitance, which enables substitution of an LED for an electrolytic capacitor in buck converter circuits in power supplies. We have carried out many experimental tests to come up with a new mathematical model that represents the DC output voltage across the LEDs. The LED equivalent circuits shown in FIGS. 2 and 3 are used. The DC output voltage is given by:

$$V_{O(DC)} = \frac{D(V_{in} - V_{ds}) - D'V_d}{1 + \frac{R_L}{R_{LED}}}, \quad (1)$$

where RLED is the LED's internal resistance. The value of RLED depends on the current passing through the LED, and it can be deduced from the I-V characteristics curve of the LED shown in graph 400 of FIG. 4. It is clear from plot 400 that as the current increases, the value of RLED will decrease. In the AC model 300 of FIG. 3, $r_s$ represents the constant series contact resistance and quasi-neutral region resistance of the LED, $r_d$ represents the small signal resistance of the LED at certain DC current, and $C_d$ represents the diffusion capacitance at a certain DC current. In conduction mode, $r_d$ is the reciprocal of the conductance, which is equal to the DC current divided by the thermal voltage. This indicates that as the DC current increases, the value of the resistance $r_d$ will decrease. Moreover, the value of $C_d$ also is a function of the conductance, and its value will increase as the current increases. The behavior of $r_d$ and $C_d$ gives an indication that as the DC current increases, the ripple voltage will decrease, which is another parameter that can control and affect the ripple voltage. This fact is supported by experimental results.

It is important to point out that the value of $C_d$ is linearly changing with the DC current only in strong conduction mode. However, during the OFF period in the switching Buck converter pulse, the LED internal resistance will draw the stored charge, and the output voltage will decrease. If the OFF period is long enough, the value of the diffusion capacitor will be very small, causing a dramatic drop in the output voltage that might cause flicker in the LED light. Consequently, this will limit the OFF period, therefore limiting the frequency and duty cycle to certain ranges. The effective capacitance of the LED is found as follows:

$$I_{pp} = \frac{V_{in} - (V_o + V_{ds} + V_{r_L})}{Lf_s} D, \quad (2)$$

where $I_{pp}$ is the ripple current through the inductor L. From circuit 100 and model 300, assume no diffusion capacitance, $C_d$. Then:

$$V_r = I_{pp} R_{LOAD} = I_{pp}(r_d + r_s) \quad (3)$$

If we assume a capacitance $C_d$ and an infinite parallel resistance $r_d$, then:

$$V_r = I_{pp}\left(\frac{1}{8fC_d} + r_s\right). \quad (4)$$

From equation 4, the effective impedance of the capacitor is $1/(8f\,C_d)$. Equations 3 and 4 can be written as:

$$V_r = \alpha I_{pp} r_d + I_{pp} r_s, \quad (5)$$

and $$V_r = \beta I_{pp}\left(\frac{1}{8fC_d}\right) + I_{pp} r_s, \quad (6)$$

where $\alpha + \beta = 1$ and from the current divider rule, $$\alpha = \frac{1}{1 + 8fC_d r_d} \text{ and } \beta = \frac{8fC_d r_d}{1 + 8fC_d r_d}. \quad (7)$$

Using the small model approximation for the pn junction diode, the DC current is related to the value of the dynamic resistance and the diffusion capacitor by:

$$r_d = \frac{1}{g_d} \text{ and } C_d = \tau g_d, \quad (8)$$

where $\tau$ is the diffusion time constant and $g_d$ is the known transconductance, defined as $g_d = I_{DC}/\eta V_t$, and $V_t$ is the thermal voltage. By incorporating the definitions of equation (8) in the values of $\alpha$ and $\beta$ then:

$$\alpha = \frac{1}{1 + 8f\tau} \text{ and } \beta = \frac{8f\tau}{1 + 8f\tau}. \quad (9)$$

From equation (9), if the value of $8f\tau \gg 1$, then the impedance of the capacitor is very small compared to the resistance $r_d$, leading to $\alpha = 0$ and $\beta = 1$. This case will satisfy the ideal situation with a negligible load effect on the ripple voltage. In other words, all the current $I_{pp}$ will flow through the capacitor. Substituting the values of $\alpha$ and $\beta$ from equation (9) in equations (5) and (6) leads to the ripple equation, which is given by:

$$V_r = I_{pp}\left(\frac{1}{g_d(1 + 8f\tau)} + r_s\right) = I_{pp}\left(\frac{1}{g_d + 8fC_d} + r_s\right). \quad (10)$$

Rewriting equation (10) to find the effective capacitance $C_d$ using the experimental data yields:

$$C_d = \frac{1}{8f}\left(\frac{1}{\frac{V_r}{I_{pp}} - r_s} - g_d\right). \quad (11)$$

Figure 5:
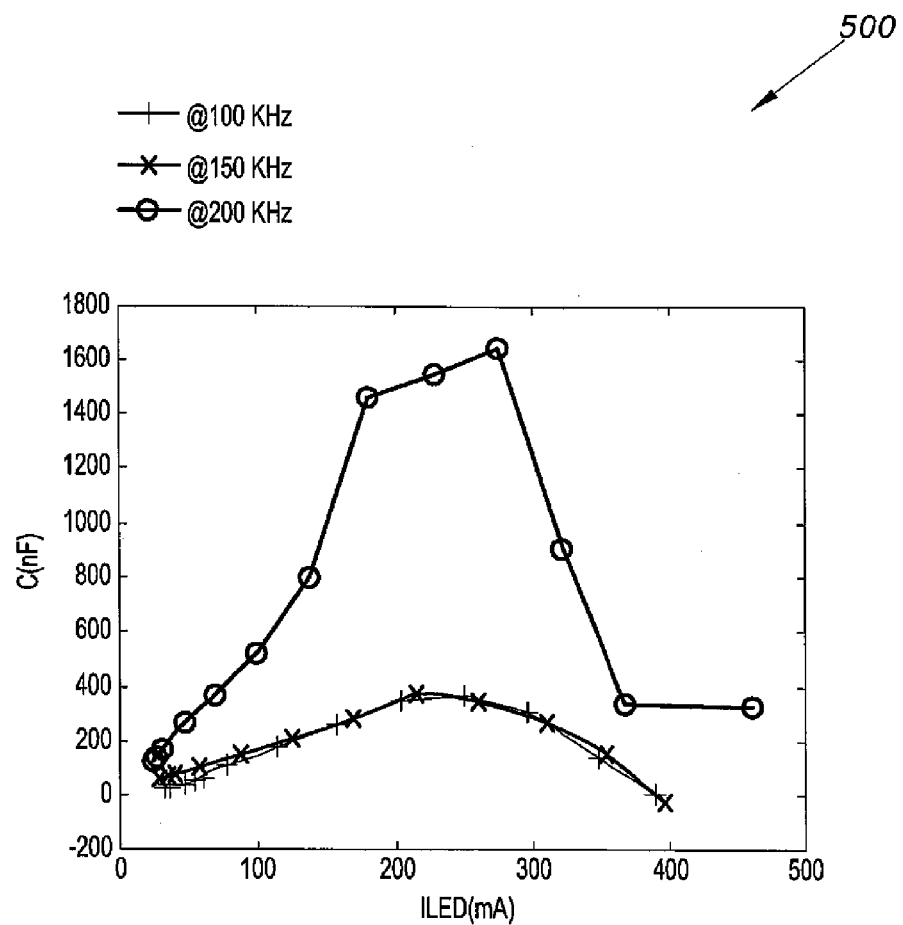
FIG. 5 is a plot showing effective capacitance vs load current (LED current) at different frequencies.

A plot of the effective capacitance as a function of the LED current for different frequencies is shown in plot 500 of FIG. 5. It is evident from the plot that the effective capacitance at 200 kHz is high, since the impedance of the capacitance is much smaller than that of the dynamic resistance.

The capacitor-less LED drive circuit 100 shown in FIG. 1 was connected in the laboratory using off-the-shelf components to test the proposed design experimentally. The LED used is the sum of three series packages of 11 parallel LEDs per package, giving a total of 33 LEDs. The output voltage is measured across the LED packages. The components used are as follows: L is an inductor of 470 μH, Q1 is an N-MOS power transistor BUZ71, Vpulse is the switching control pulse with an amplitude of 10V, and D1 is a silicon fast-switching diode 1N914. The inductor's series resistance is measured, and its value is around 4Ω. We assume the ac source is rectified and provides a DC output called Vin with nominal voltage of 35V. The LED's I-V characteristics are shown in plot 400, which has been used to extract the value of $R_{LED}$ for different DC current values.

Figure 6:
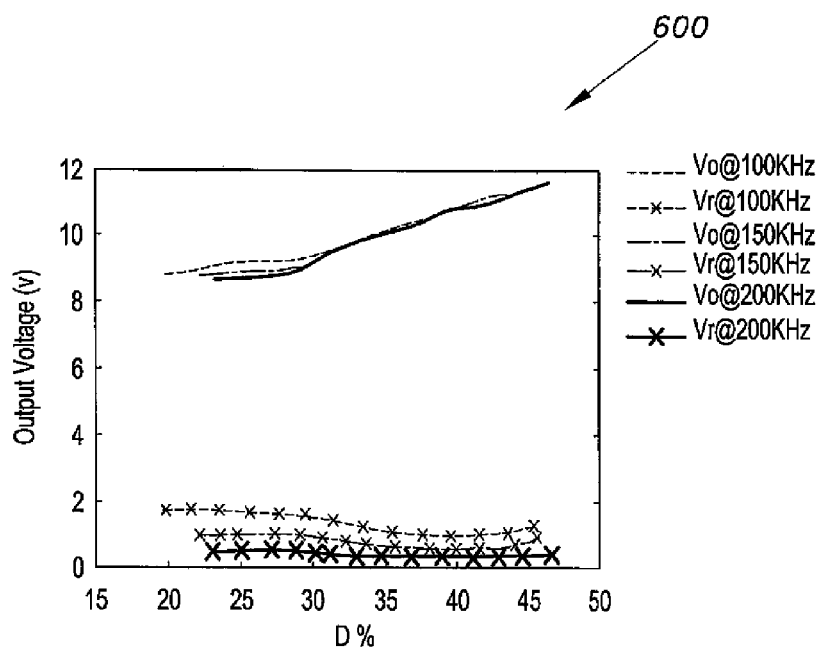
FIG. 6 is a plot showing output voltage and ripple voltage as a function of duty cycle at different frequencies in a capacitor-less LED drive according to the present invention.

The behavior of the circuit was studied by varying the duty cycle of Vpulse from 18% to 44% at three different frequencies (100 KHz, 150 KHz and 200 KHz). The maximum duty cycle was set to 44% because this duty cycle will produce the maximum current that can be handled by the LEDs. The output voltage was probed across the LEDs for the DC output and ripple voltage, and results were plotted as shown in plot 600 of FIG. 6. It is clear from plot 600 that as the duty cycle increases, the DC output voltage increases. The ripple voltage is decreasing with the increase of frequency.

Figure 7:
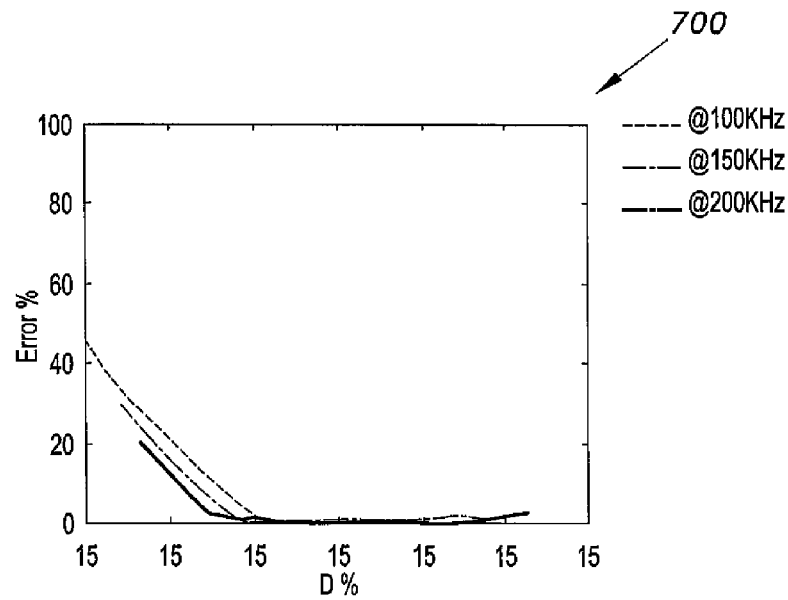
FIG. 7 is a plot showing error percent (deviation of experimental output voltage from theoretical calculations) as a function of duty cycle at different frequencies in a capacitor-less LED drive according to the present invention.

The deviation between theoretical and experimental results is shown in plot 700 of FIG. 7. It is evident from plot 700 that a designer should select the switching pulse duty cycle to be greater than 30% to minimize the error and use higher frequencies to minimize the ripple voltage.

From plot 600, the DC voltage is linearly changing with the duty cycle for D>30%. Also, the error curve in plot 700 shows that for duty cycle greater than 30%, the error is less than 3%. However, the error is much greater with less than 30% duty cycle, and this is due to the long OFF period of the buck switch, resulting in non-linear behavior of the LED voltage. If the voltage across the LED is below a certain value, there will be no diffusion capacitor and the LED's voltage will drop logarithmically, causing the large error shown. This value can be estimated from the knees of each curve in plot 700, and it depends on the forward current as well, since it depends on how deep the LED is in the conduction region.

Figure 8:
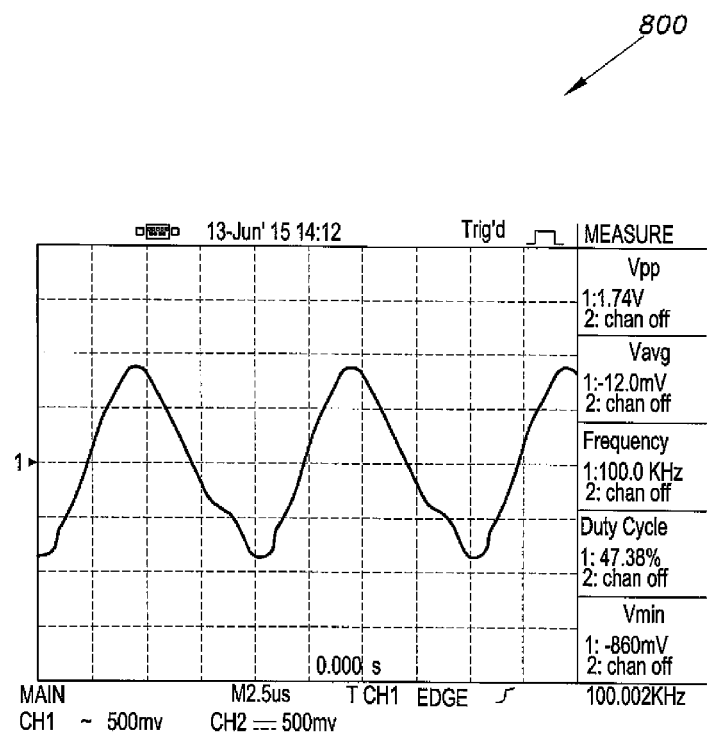
FIG. 8 is a plot showing ripple voltage as a function of time of the capacitor-less LED drive according to the present invention at 100 kHz with a duty cycle of 18%.
Figure 9:
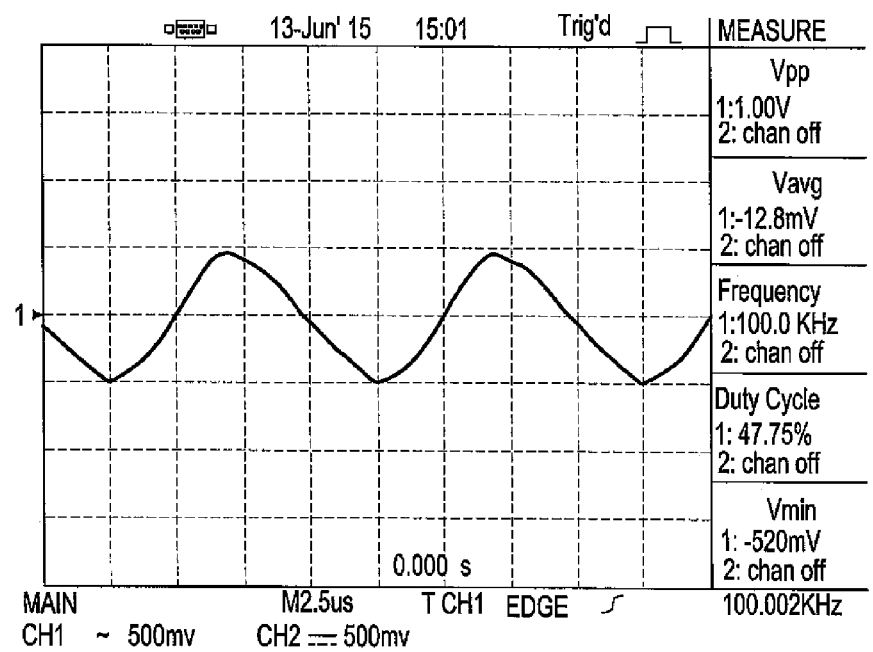
FIG. 9 is a plot showing ripple voltage as a function of time of the capacitor-less LED drive according to the present invention at 100 kHz with a duty cycle of 40%.

Plots 800 and 900 of FIGS. 8 and 9, respectively, show the ripple voltage at 100 kHz, with a duty cycle of 18% and 40%, respectively. The non-linearity is clearly shown in plot 800, where the off period was long enough to drive the LED to the weak conduction region, while the ripple of plot 900 is almost linear. It is clear that the ripple is linear for higher duty cycle.

Figure 10:
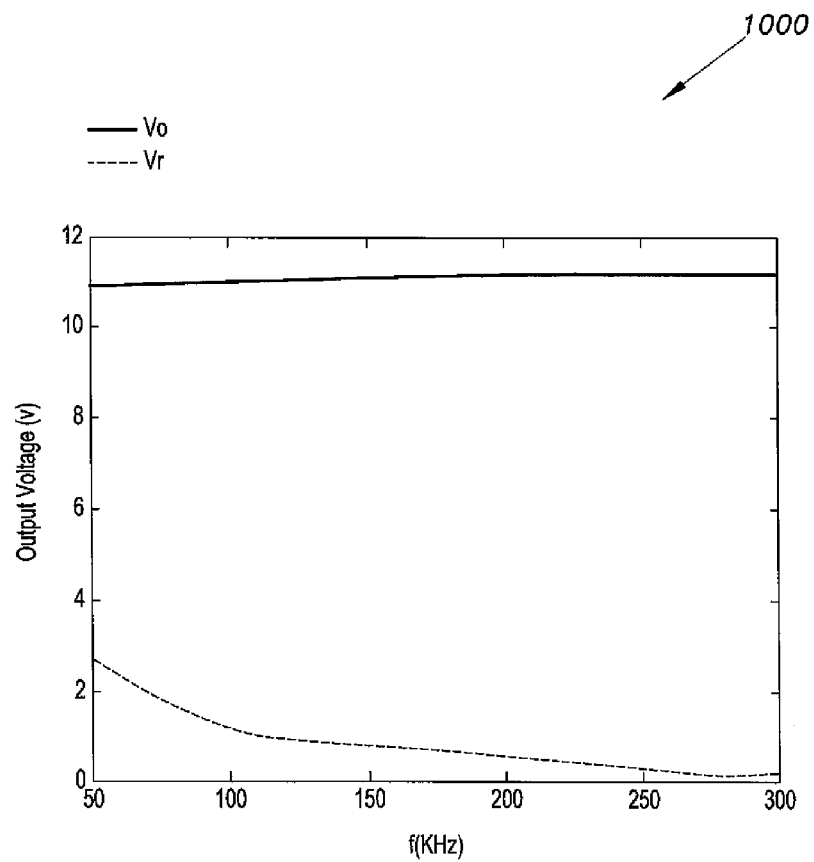
FIG. 10 is a plot showing DC output voltage and ripple voltage as a function of frequency of the capacitor-less LED drive according to the present invention with a duty cycle of 40%.

To see the changes on the DC output voltages and ripple, the frequency was swept at a fixed duty cycle of 40% from 50 kHz to 300 kHz, and the output was probed. The result is shown in plot 1000 of FIG. 10. It is clear that the ripple voltage is decreasing as the frequency is increasing, and the DC voltage is almost constant. The minimum ratio of ripple voltage to DC voltage is around 1.4%, and it can be decreased further by increasing the frequency.

Figure 11:
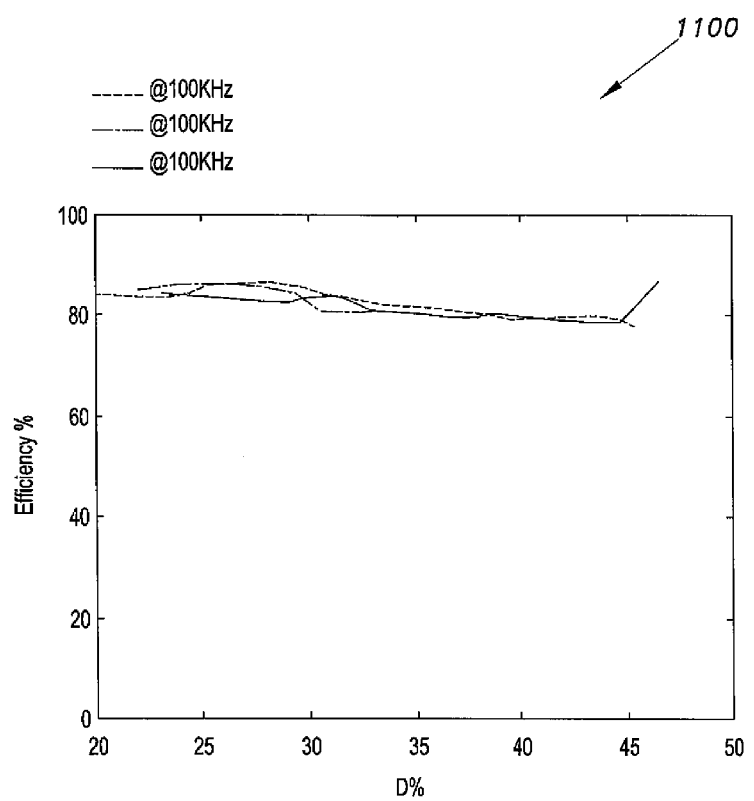
FIG. 11 is a plot showing efficiency as a function of duty cycle at selected frequencies for the capacitor-less LED drive according to the present invention.

Efficiency is an important factor in an LED drive. The efficiency was found by measuring the DC output voltage, the output current, the DC input voltage and the input current for each duty cycle for different frequencies. Experimental results are displayed in plot 1100 of FIG. 11, and show that the average efficiency is 85%. The efficiency can be improved further using an inductor with smaller internal resistance and transistor with smaller ON resistance.

Figure 12:
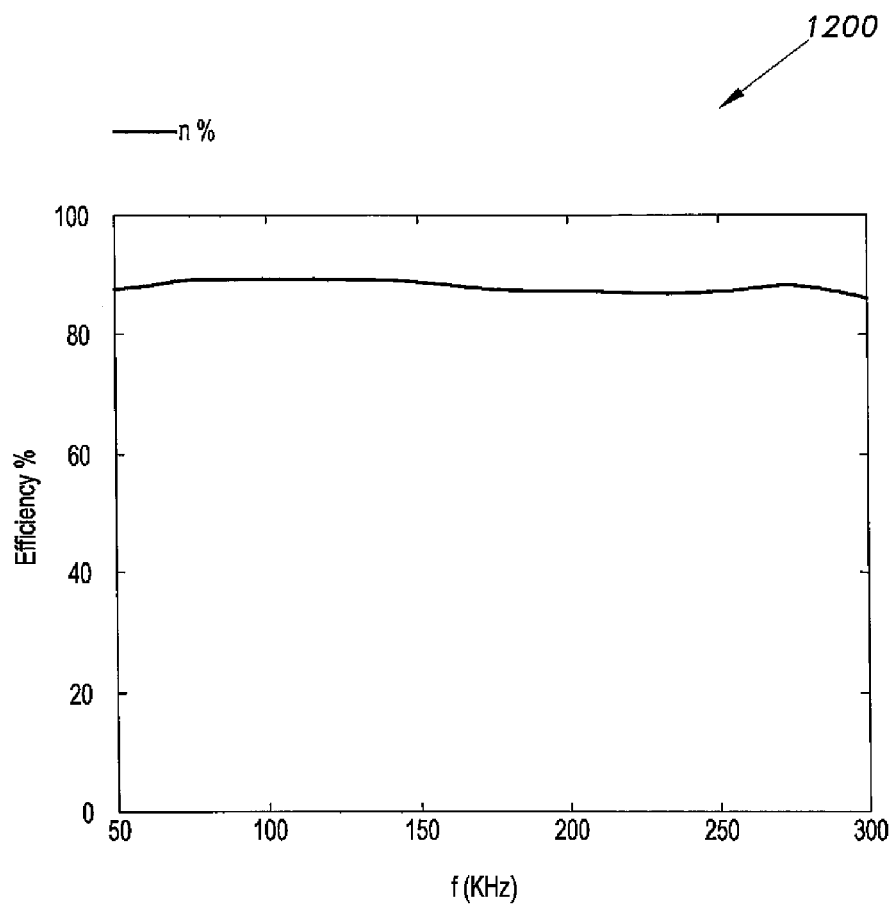
FIG. 12 is a plot showing efficiency as a function of frequency for the capacitor-less LED drive according to the present invention.

Because of the slight changes in the DC output voltage, the efficiency is barely changing with the change of the frequency, as shown in plot 1200 of FIG. 12. The average of the efficiency over the frequency range was about 88%. Increasing the frequency further will lead to smaller ripple voltage and smaller components for better integration. However, increasing the switching frequency will reduce the efficiency of the drive because of the switching power loss for light loads. As for LED lighting applications, the LED load needs to draw high current specially when using a capacitor-less drive. This is because it is better to use many parallel LEDs for higher summation of LED capacitance, which gives this method one more advantage.

It is to be understood that the present invention is not limited to the embodiments described above, but encompasses any and all embodiments within the scope of the following claims.

We claim:

1. A capacitor-less LED drive, consisting of:
   an AC-DC rectifier circuit having positive and negative output terminals;
   a capacitor-less buck DC-DC converter circuit connected to the positive and negative output terminals of the rectifier, the capacitor-less buck DC-DC converter circuit having a switching circuit portion and a smoothing circuit portion, the switching circuit portion having an N-MOS power transistor and a silicon fast-switching diode connected to the N-MOS power transistor, the smoothing circuit portion having:
      an LED bank having an anode and a cathode, the anode of the LED bank being connected to the positive output terminal of the AC-DC rectifier; and
      an inductor having a first lead connected to the cathode of the LED bank and a second lead connected to the switching circuit portion of the buck DC-DC converter circuit; and
   a voltage pulse circuit connected to the switching circuit portion of the buck DC-DC converter circuit.

2. The capacitor-less LED drive according to claim 1, wherein the inductor has a value of 470 µH.

3. The capacitor-less LED drive according to claim 1, wherein the AC-DC rectifier has an output providing a nominal 35 volts.

4. The capacitor-less LED drive according to claim 1, wherein the voltage pulse circuit has a duty cycle of less than 30%.

\* \* \* \* \*